(12) United States Patent
Diaz et al.

(10) Patent No.: US 7,275,758 B1
(45) Date of Patent: Oct. 2, 2007

(54) SHOPPING CART

(76) Inventors: Humberto Diaz, 226 W. 34th St., Hialeah, FL (US) 33012; Yudinis Diaz, 226 W. 34th St., Hialeah, FL (US) 33012

( * ) Notice: Subject to any disclaimer, the term of this patent is extended or adjusted under 35 U.S.C. 154(b) by 104 days.

(21) Appl. No.: 11/350,594

(22) Filed: Feb. 10, 2006

(51) Int. Cl.
*B62B 1/00* (2006.01)
(52) U.S. Cl. ............... 280/651; 280/33.995; 280/47.34
(58) Field of Classification Search ................ 280/651, 280/641, 657, 652, 30, 37, 47.12, 47.34, 280/47.2, 43.17, 648, 33.991, 33.995, 33.996
See application file for complete search history.

(56) References Cited

U.S. PATENT DOCUMENTS

| | | | |
|---|---|---|---|
| 2,564,939 A * | 8/1951 | Weast | 280/652 |
| 2,812,188 A * | 11/1957 | Rusch | 280/641 |
| 2,920,900 A | 2/1960 | Best | |
| 4,185,848 A | 1/1980 | Holtz | |
| 4,339,141 A * | 7/1982 | Thiboutot | 280/652 |
| 4,765,646 A | 8/1988 | Cheng | |
| 4,953,878 A * | 9/1990 | Sbragia | 280/37 |
| 5,294,158 A | 3/1994 | Cheng | |
| 5,464,234 A * | 11/1995 | Ferguson | 280/47.12 |
| D371,664 S | 7/1996 | Ponce | |
| 5,649,718 A * | 7/1997 | Groglio | 280/641 |
| 5,906,383 A | 5/1999 | Cortes | |
| 6,827,364 B1 * | 12/2004 | Martin | 280/641 |
| 6,866,289 B2 * | 3/2005 | Prather | 280/651 |
| 6,869,097 B2 * | 3/2005 | Prather et al. | 280/651 |
| 2005/0140119 A1 * | 6/2005 | Wong | 280/651 |

* cited by examiner

*Primary Examiner*—Hau Phan

(57) ABSTRACT

A shopping cart with a frame basket member, with a floor and a contiguous wall extending vertically from the floor. There are a pair of substantially U-shaped carrying handles with ends that are pivotally attached to the upper frame member. The handles pivot between a raised position for carrying, and a lowered position. There is also a main handle with ends that are pivotally attached to the upper frame member. The main handle pivots between a raised position for carrying, and a lowered position where the handle rests around the basket member. There are a pair of support members attached to the floor of the cart and a pair of wheel supports attached to the floor opposite the support members. The wheel supports have an attached wheel shaft and a wheel.

14 Claims, 3 Drawing Sheets

SHOPPING CART

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Many offerings exist by which groceries may be carried through a store. The devices offered, however, do not solve all problems associated with maneuverability and convenience. When a basket with handles is used, the shopper cannot accommodate the addition of larger items. When a larger wheeled cart is used, the shopper sacrifices maneuverability.

1. Field of the Invention

The present invention relates to a shopping cart for use in connection with carrying groceries or other sundries. The shopping cart has particular utility in connection with providing an efficient and easy method of maneuvering through crowded store aisles while shopping.

2. Description of the Prior Art

The use of shopping carts is known in the prior art. For example, U.S. Pat. No. 5,906,383 to Cortes discloses a home shopping cart. However, the Cortes '383 patent does not provide the ease of carrying of the present invention, and has further drawbacks of not being as maneuverable as the present invention.

U.S. Pat. No. 5,294,158 to Cheng discloses a collapsible handcart that can be used for shopping. However, the Cheng '158 patent does not have the ease of carrying of the present invention, and additionally is not as maneuverable as the present invention.

While the above-described devices fulfill their respective and particular objects and requirements, they do not describe a shopping cart that provides the advantages of the present invention; therefore, a need exists for an improved shopping cart, particularly one that includes the ease of use when shopping for a small quantity of groceries as the present invention, while allowing the user to carry as a basket or wheel as a cart if desired.

In this respect, the present invention substantially departs from the conventional concepts and designs of the prior art.

SUMMARY OF THE INVENTION

In view of the foregoing disadvantages inherent in the known types of shopping carts now present in the prior art, the present invention provides an improved shopping cart, and overcomes the above-mentioned disadvantages and drawbacks of the prior art. As such, the general purpose of the present invention, which will be described subsequently in greater detail, is to provide a new and improved shopping cart and method which has all the advantages of the prior art mentioned heretofore and many novel features that result in a shopping cart which is not anticipated, rendered obvious, suggested, or even implied by the prior art, either alone or in any combination thereof.

To attain this, the present invention essentially comprises a frame basket member having a floor and a contiguous wall extending vertically from the floor. The basket member has four sides and four corners. There is a reinforced upper frame member that the handles are attached to and that strengthens the basket member.

There are a pair of substantially U-shaped carrying handles, with ends that are pivotally attached to the upper frame member. The handles pivot between a raised position extending up from the basket member for carrying and a lowered position where the handles rest in the basket member.

There is a substantially U-shaped main handle with ends that are pivotally attached to the upper frame member. The handle pivots between a raised position extending up from the basket member for pushing or pulling, and a lowered position where the handle rests around the basket member.

There are a pair of support members attached to the floor for resting the basket on and a pair of wheel supports attached to the floor opposite the support members. The wheel supports have a wheel shaft attached to the wheel supports and a wheel is attached to the wheel shaft.

There has thus been outlined, rather broadly, the more important features of the invention in order that the detailed description thereof that follows may be better understood and in order that the present contribution to the art may be better appreciated.

The invention may also include a telescoping main handle. There are, of course, additional features of the invention that will be described hereinafter and which will form the subject matter of the claims attached.

It is therefore an object of the present invention to provide a new and improved shopping cart that has all of the advantages of the prior art shopping cart and none of the disadvantages.

It is another object of the present invention to provide a new and improved shopping cart that may be easily and efficiently manufactured and marketed.

An even further object of the present invention is to provide a new and improved shopping cart that has a low cost of manufacture with regard to both materials and labor, and which accordingly is then susceptible of low prices of sale to the consuming public, thereby making such shopping cart economically available to the buying public.

Still another object of the present invention is to provide a new shopping cart that provides in the apparatuses and methods of the prior art some of the advantages thereof, while simultaneously overcoming some of the disadvantages normally associated therewith.

Even still another object of the present invention is to provide a shopping cart for easy maneuvering through a grocery store. This allows the user to conveniently gather the needed sundries and either carry them in the basket or use the main handle and wheel them through the store.

Still yet another object of the present invention is to provide a shopping cart for the user to purchase and use on trips to the store with their own cart. This makes it possible to load the entire cart into the car or onto the bus as the present invention is small enough to load without needing to use another conveyance.

Thus has been broadly outlined the more important features of the shopping cart so that the detailed description thereof that follows may be better understood and in order that the present contribution to the art may be better appreciated.

Numerous objects, features and advantages of the shopping cart will be readily apparent to those of ordinary skill in the art upon reading the following detailed description of presently preferred, but nonetheless illustrative, embodiments of the shopping cart when taken in conjunction with the accompanying drawings. In this respect, before explaining the current embodiments of the shopping cart in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the shopping cart. It is therefore important that the claims be regarded as including such equivalent constructions insofar as they do not depart from the spirit and scope of the present invention.

These together with additional objects of the shopping cart, along with various novel features that characterize the invention are particularly pointed out in the claims forming a part of this disclosure. For better understanding of the shopping cart, its operating advantages and specific objects attained by its uses, refer to the accompanying drawings and description.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numbers refer to the same parts throughout the various figures.

DETAILED DESCRIPTION OF THE PREFERRED EMBODIMENT

Figure 4:
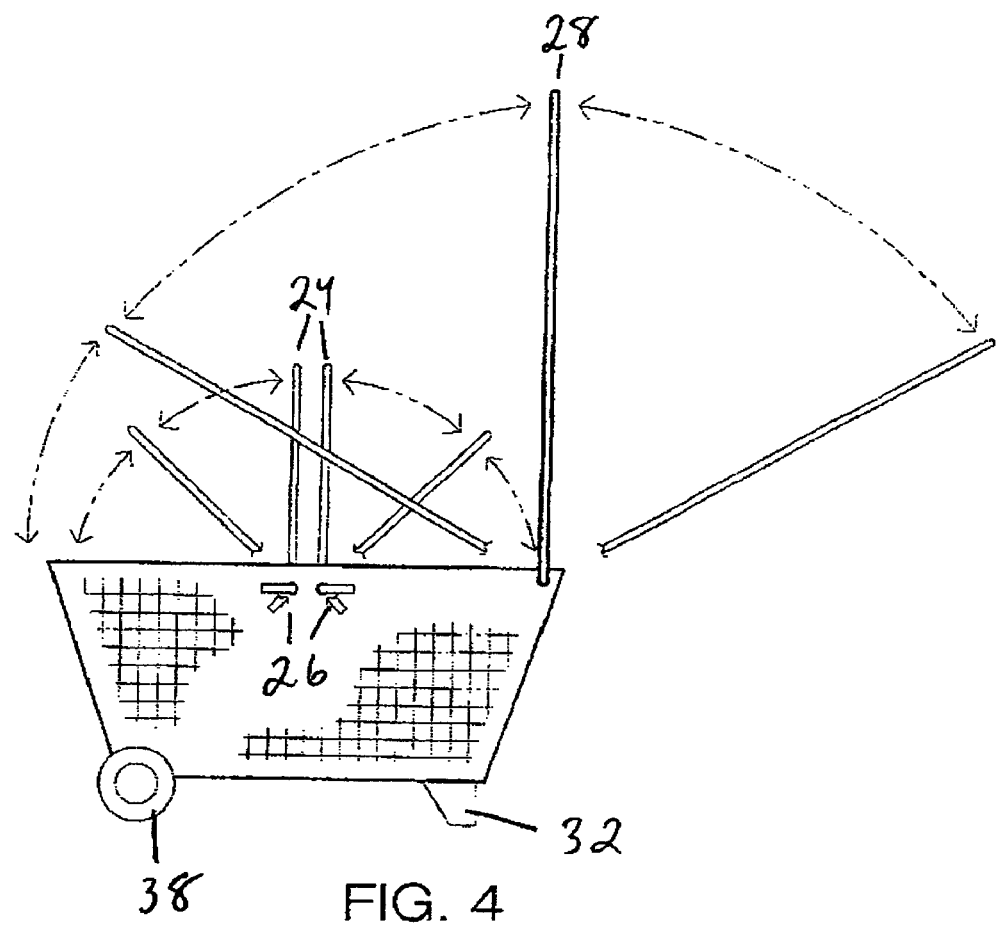
FIG. 4 is a side view of the shopping cart, showing the range of movement of the handles.
Figure 5:
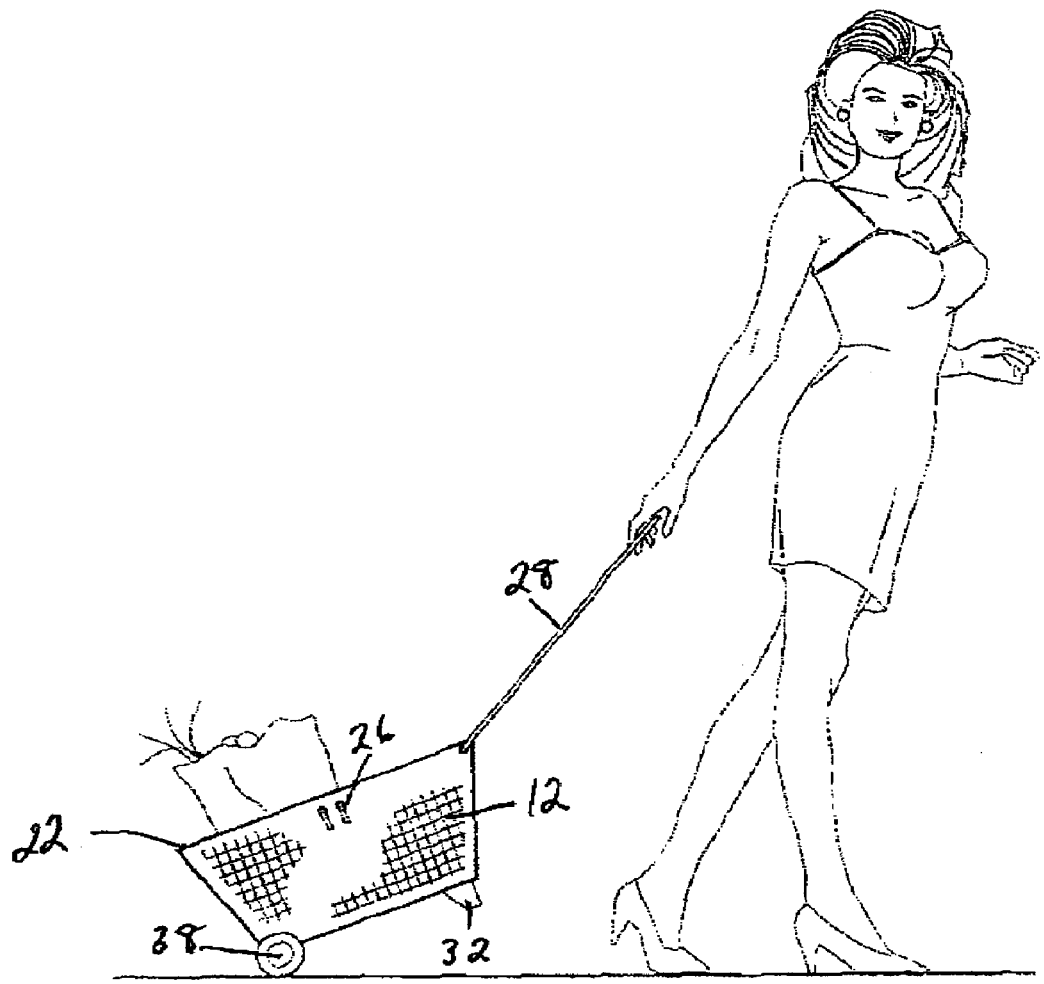
FIG. 5 is an in use view of the shopping cart.

Referring now to the drawings, and particularly to FIGS. 4-5, a preferred embodiment of the shopping cart of the present invention is shown and generally designated by the reference numeral 10.

Figure 1:
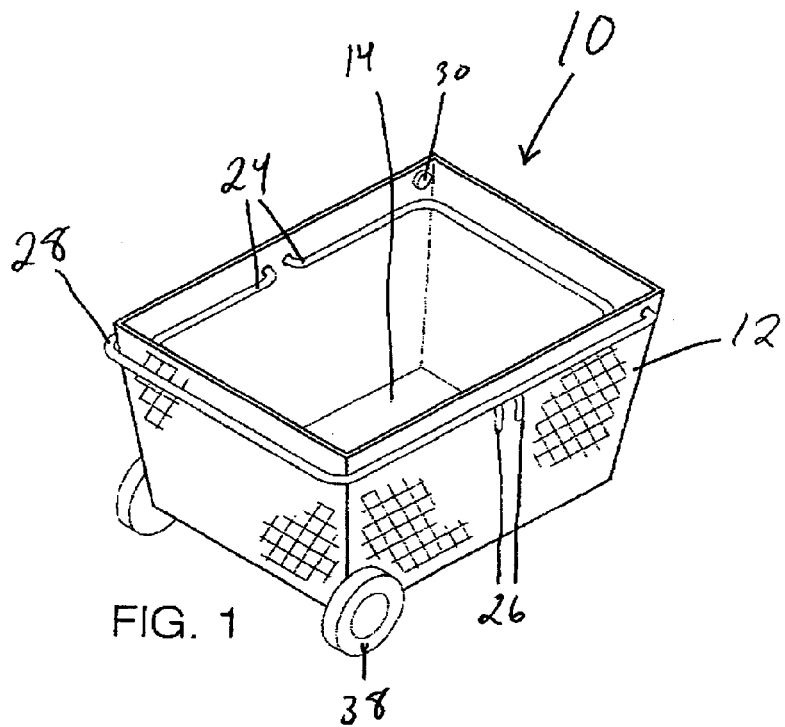
FIG. 1 is a right perspective view of the preferred embodiment of the shopping cart constructed in accordance with the principles of the present invention.

In FIG. 1, a new and improved shopping cart 10 of the present invention for new function is illustrated and will be described. More particularly, the shopping cart 10 has a frame basket member 12 having a floor 14 and a contiguous wall 16 extending vertically from the floor 14. The basket member has four sides 18 and four corners 20, and can be either rectangular or square, as desired by the manufacturer and end user. The pair of substantially U-shaped carrying handles 24 can be seen resting in a lowered position wherein the handles 24 rest within the basket member 12. One of the pair of opposite terminal ends 26 can be seen on the outside of the basket member 12, and each end 30 is pivotally attached to the upper frame member 22 of the basket member 12. The substantially U-shaped main handle 28 is also shown in a lowered position wherein the handle 28 rests around the basket member 12. One of the pair of opposite terminal ends 30 can be seen in the inside storage area of the basket member 12, and each end 30 is pivotally attached to the upper frame member 22 of the basket member 12. The pair of wheel supports 34 and wheels 38 are also shown.

Figure 2:
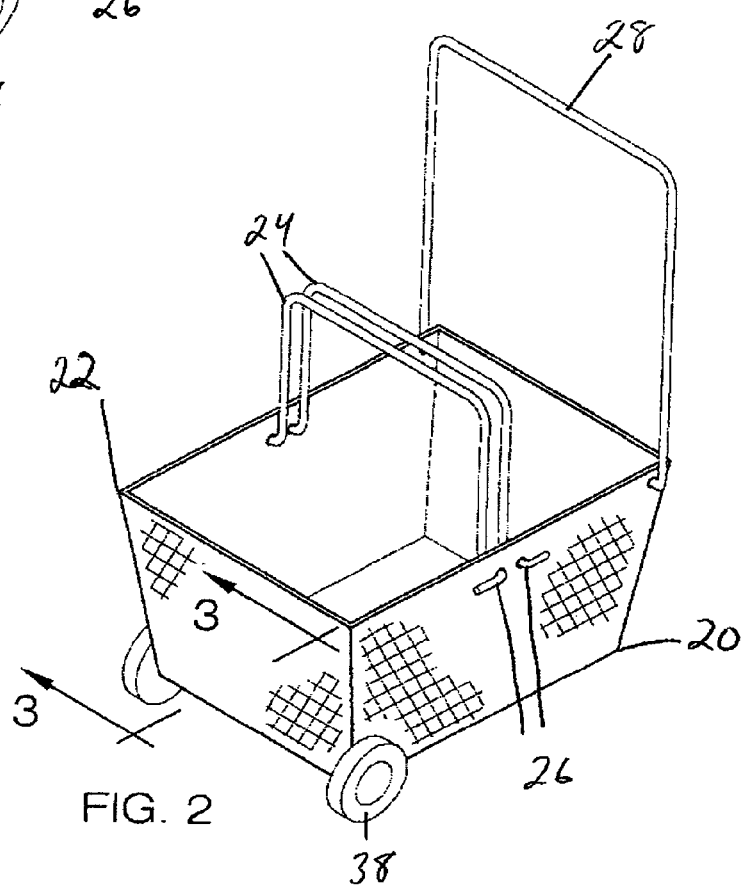
FIG. 2 is a right perspective view of the shopping cart, showing the handles raised.

Shown in FIG. 2 is the frame basket member 12 having a floor 14 and a contiguous wall 16 extending vertically from the floor 14. The basket member has four sides 18 and four corners 20. The pair of substantially U-shaped carrying handles 24 can be seen in a raised position extending upwardly from the basket member 12. One of the pair of opposite terminal ends 26 can be seen on the outside of the basket member 12, and each end 30 is pivotally attached to the upper frame member 22 of the basket member 12. The substantially U-shaped main handle 28 is also shown in a raised position extending upwardly from the basket member 12. One of the pair of opposite terminal ends 30 can be seen in the inside storage area of the basket member 12, and each end 30 is pivotally attached to the upper frame member 22 of the basket member 12. The pair of wheel supports 34 and wheels 38 are also shown.

Figure 3:
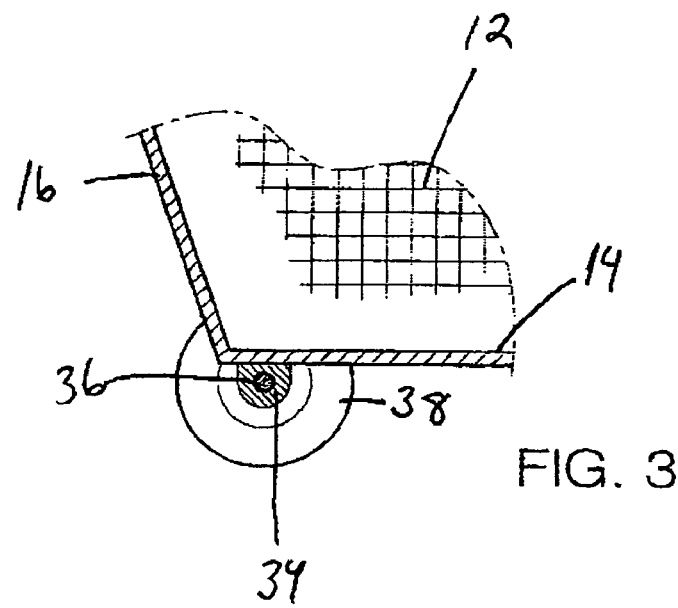
FIG. 3 is a cut away view of the shopping cart, taken essentially along the lines 3-3 of FIG. 2.

In FIG. 3, which is essentially a cut away taken along the lines 3-3 of FIG. 2, the floor 14 and contiguous wall 16 are shown as is the pair of wheel supports 34 attached to the floor 14, each of the wheel supports 34 having a wheel shaft 36 attached to the wheel supports 34 and a wheel 38 attached to the wheel shaft 36.

In FIG. 4, the frame basket member 12 having a floor 14 and a contiguous wall 16 extending vertically from the floor 14. The basket member has four sides 18 and four corners 20. The pair of substantially U-shaped carrying handles 24 can be seen in a raised position extending upwardly from the basket member 12. The movement of the handles 24 as each end 30 pivots from its attachment point on the upper frame member 22 of the basket member 12 can be seen in this Figure. The substantially U-shaped main handle 28 is also shown in a raised position extending upwardly from the basket member 12. The movement of the handles 24 as each end 30 pivots from its attachment point on the upper frame member 22 of the basket member 12 can be seen in this Figure. The pair of support members 32 and pair of wheel supports 34 attached to the floor 14 are shown as are the wheels 38.

In FIG. 5, the shopping cart 10 is shown in use, with groceries or various sundries inside the internal storage area defined by the frame basket member 12 having a floor 14 and a contiguous wall 16 extending vertically from the floor 14, The basket member has four sides 18 and four corners 20, as well as an upper frame member 22. The pair of substantially U-shaped carrying handles 24 that pivot on the pair of opposite terminal ends 26 between a raised position extending upwardly from the basket member 12 and a lowered position wherein the handles 24 rest within the basket member 12, are shown resting within the frame basket member 12. The substantially U-shaped main handle 28 that pivots on the pair of opposite terminal ends 30 between a raised position extending upwardly from the basket member 12 and a lowered position wherein the handle 28 rests around the basket member 12, is shown in the raised position, as the user is pulling the shopping cart 10. The pair of support members 32 attached to the floor 14 are shown. The pair of wheel supports 34 attached to the floor 14 and the wheel shafts 36 attached to the wheel supports 34 are not shown but can be inferred from the position of the wheels 38 attached to the wheel shafts 36.

In use, it can now be understood that the shopping cart is used as shown, with groceries or various sundries inside the internal storage area defined by the frame basket member having a floor and a contiguous wall extending vertically from the floor. The basket member has four sides and four corners, as well as an upper frame member. The pair of substantially U-shaped carrying handles pivot on the pair of opposite terminal ends between a raised position extending upwardly from the basket member and a lowered position wherein the handles rest within the basket member. The substantially U-shaped main handle pivots on the pair of opposite terminal ends between a raised position extending upwardly from the basket member and a lowered position wherein the handle rests around the basket member. The pair of support members attached to the floor are used when the shopping cart is resting on the floor, as when it is not being moved anywhere using the wheels. The pair of wheel supports attached to the floor and the wheel shafts attached to the wheel supports are used to allow the maneuverability provided by the present invention.

The inventors conceived the present invention while shopping and taking care of their son at the same time. They believe the improved shopping cart will add convenience to shopping and increase the ease of maneuvering through the store.

While a preferred embodiment of the shopping cart has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material may be used instead of the metal or plastic described. And although in store and consumer uses have been described, it should be appreciated that the shopping cart herein described is also suitable for use in a variety of locations, anywhere portability and ease of conveyance is important.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A shopping cart comprising:
   a frame basket member having a floor and a contiguous wall extending vertically therefrom, said basket member having four sides and four corners and having an upper frame member;
   a pair of substantially U-shaped carrying handles, each handle having a pair of opposite terminal ends, each end pivotally attached to said upper frame member of said basket member, said pair of handles pivotable between a raised position extending upwardly from said basket member and a lowered position wherein said handles rest within said basket member;
   a substantially U-shaped main handle having a pair of opposite terminal ends, each end pivotally attached to said upper frame member of said basket member, said handle pivotable between a raised position extending upwardly from said basket member and a lowered position wherein said handle rests around said basket member;
   a pair of support members attached to said floor;
   a pair of wheel supports attached to said floor opposite said support members, each of said wheel supports having a wheel shaft attached to said wheel supports and a wheel attached to said wheel shaft.

2. The shopping cart of claim 1 wherein said U-shaped main handle has parallel telescoping sections.

3. The shopping cart of claim 1 wherein frame basket member and said upper frame are substantially rectangular.

4. The shopping cart of claim 1 wherein said frame basket member and said upper frame are substantially square.

5. The shopping cart of claim 1 wherein said frame basket member is metal.

6. The shopping cart of claim 1 wherein said frame basket member is plastic.

7. A shopping cart comprising:
   a frame basket member having a floor and a contiguous wall extending vertically therefrom, said basket member having four sides and four corners and having an upper frame member, wherein frame basket member and said upper frame are substantially rectangular;
   a pair of substantially U-shaped carrying handles, each handle having a pair of opposite terminal ends, each end pivotally attached to said upper frame member of said basket member, said pair of handles pivotable between a raised position extending upwardly from said basket member and a lowered position wherein said handles rest within said basket member;
   a substantially U-shaped main handle having a pair of opposite terminal ends, each end pivotally attached to said upper frame member of said basket member, said handle pivotable between a raised position extending upwardly from said basket member and a lowered position wherein said handle rests around said basket member;
   a pair of support members attached to said floor;
   a pair of wheel supports attached to said floor opposite said support members, each of said wheel supports having a wheel shaft attached to said wheel supports and a wheel attached to said wheel shaft.

8. The shopping cart of claim 7 wherein said frame basket member is metal.

9. The shopping cart of claim 7 wherein said frame basket member is plastic.

10. The shopping cart of claim 7 wherein said U-shaped main handle has parallel telescoping sections.

11. A shopping cart comprising:
    a frame basket member having a floor and a contiguous wall extending vertically therefrom, said basket member having four sides and four corners and having an upper frame member, wherein frame basket member and said upper frame are substantially square;
    a pair of substantially U-shaped carrying handles, each handle having a pair of opposite terminal ends, each end pivotally attached to said upper frame member of said basket member, said pair of handles pivotable between a raised position extending upwardly from said basket member and a lowered position wherein said handles rest within said basket member;

a substantially U-shaped main handle having a pair of opposite terminal ends, each end pivotally attached to said upper frame member of said basket member, said handle pivotable between a raised position extending upwardly from said basket member and a lowered position wherein said handle rests around said basket member;

a pair of support members attached to said floor;

a pair of wheel supports attached to said floor opposite said support members, each of said wheel supports having a wheel shaft attached to said wheel supports and a wheel attached to said wheel shaft.

12. The shopping cart of claim 11 wherein said U-shaped main handle has parallel telescoping sections.

13. The shopping cart of claim 11 wherein said frame basket member is metal.

14. The shopping cart of claim 11 wherein said frame basket member is plastic.

* * * * *